United States Patent
Baldrey

(10) Patent No.: US 11,249,447 B2
(45) Date of Patent: Feb. 15, 2022

(54) METHODS TO SUBSTANTIALLY OPTIMIZE CONCENTRATION OF MATERIALS IN AN OUTPUT STREAM

(71) Applicant: ADA-ES, Inc., Highlands Ranch, CO (US)

(72) Inventor: Kenneth E. Baldrey, Denver, CO (US)

(73) Assignee: ADA-ES, Inc., Highlands Ranch, CO (US)

( * ) Notice: Subject to any disclaimer, the term of this patent is extended or adjusted under 35 U.S.C. 154(b) by 57 days.

(21) Appl. No.: 16/866,196

(22) Filed: May 4, 2020

(65) Prior Publication Data

US 2020/0264573 A1    Aug. 20, 2020

Related U.S. Application Data

(62) Division of application No. 14/738,309, filed on Jun. 12, 2015, now Pat. No. 10,809,677.

(60) Provisional application No. 62/011,452, filed on Jun. 12, 2014.

(51) Int. Cl.
  *G05B 15/02*    (2006.01)
  *B01D 46/44*    (2006.01)

(52) U.S. Cl.
  CPC ........... *G05B 15/02* (2013.01); *B01D 46/442* (2013.01); *Y10T 137/0324* (2015.04); *Y10T 137/87161* (2015.04)

(58) Field of Classification Search
  CPC .................. G05B 15/02; B01D 46/442; Y10T 137/87161; Y10T 137/0324
  See application file for complete search history.

(56) References Cited

U.S. PATENT DOCUMENTS

| | | | |
|---|---|---|---|
| 2,564,690 A | 8/1951 | Havelin et al. |
| 2,820,713 A | 1/1958 | Wagner |
| 2,942,993 A | 6/1960 | Handy et al. |
| 3,155,526 A | 11/1964 | Klein |
| 3,489,685 A | 1/1970 | Kublicki |
| 3,720,609 A | 3/1973 | Smith et al. |

(Continued)

FOREIGN PATENT DOCUMENTS

| | | |
|---|---|---|
| CN | 101402516 | 4/2009 |
| CN | 102875128 | 1/2013 |

(Continued)

OTHER PUBLICATIONS

Derwent-Acc-No. 2019-36234P (abstract of Kazakhstan Patent Specification No. KZ 24438 B) (Year: 2011).

(Continued)

*Primary Examiner* — Shogo Sasaki
(74) *Attorney, Agent, or Firm* — Sheridan Ross P.C.

(57) ABSTRACT

A system, method, and computer readable medium are provided that monitors at least one of an input and output stream for at least one of a presence of a material of interest and a concentration of the material of interest; when the material of interest is present and/or has at least a threshold concentration, directs the at least one of an input and output stream to a waste location or path to discard the material of interest; and when the material of interest is either not present or does not have at least a threshold concentration, directs the at least one of an input and output stream to a byproduct location or path to recover the material of interest.

30 Claims, 3 Drawing Sheets

(56) References Cited

U.S. PATENT DOCUMENTS

| | | | |
|---|---|---|---|
| 3,769,053 A | 10/1973 | Pennachetti et al. | |
| 3,785,840 A | 1/1974 | Minnick et al. | |
| 3,859,799 A | 1/1975 | Jaco, Jr. | |
| 3,962,080 A | 6/1976 | Dulin et al. | |
| 4,043,831 A | 8/1977 | Friedman | |
| 4,058,500 A | 11/1977 | Vroom | |
| 4,088,804 A | 5/1978 | Cornwell et al. | |
| 4,116,705 A | 9/1978 | Chappell | |
| 4,147,687 A | 4/1979 | O'Donnell | |
| 4,193,810 A | 3/1980 | Ferm | |
| 4,193,811 A | 3/1980 | Ferm | |
| 4,207,115 A | 6/1980 | Boehme et al. | |
| 4,226,630 A | 10/1980 | Styron | |
| 4,229,295 A | 10/1980 | Krofchak | |
| 4,238,536 A | 12/1980 | Koch et al. | |
| 4,243,563 A | 1/1981 | Ferm | |
| 4,274,880 A | 6/1981 | Chappell | |
| 4,311,826 A | 1/1982 | McBee et al. | |
| 4,629,509 A | 12/1986 | O'Hara et al. | |
| 4,701,219 A | 10/1987 | Bonee | |
| 4,761,182 A | 8/1988 | Whitescarver et al. | |
| 4,853,208 A | 8/1989 | Reimers et al. | |
| 4,950,409 A | 8/1990 | Stanforth | |
| 5,034,203 A | 7/1991 | Audeh et al. | |
| 5,037,479 A | 8/1991 | Stanforth | |
| 5,284,636 A | 2/1994 | Goff et al. | |
| 5,397,478 A | 3/1995 | Pal et al. | |
| 5,482,550 A | 1/1996 | Strait | |
| 5,512,702 A | 4/1996 | Ryan et al. | |
| 5,527,982 A | 6/1996 | Pal et al. | |
| 5,569,155 A | 10/1996 | Pal et al. | |
| 5,678,234 A | 10/1997 | Colombo et al. | |
| 5,877,393 A | 3/1999 | Webster | |
| 5,898,093 A | 4/1999 | Vos | |
| 6,068,696 A | 5/2000 | Anttila et al. | |
| 6,235,204 B1 | 5/2001 | Castaldi et al. | |
| 6,264,740 B1 | 7/2001 | McNulty, Jr. | |
| 6,440,205 B1 | 8/2002 | Bailey et al. | |
| 6,906,235 B2 | 6/2005 | Funakoshi et al. | |
| 7,144,362 B2 | 12/2006 | Roper, Jr. | |
| 7,578,881 B2 | 8/2009 | Ramme | |
| 7,666,505 B2 | 2/2010 | Datta et al. | |
| 7,776,294 B2 | 8/2010 | Hurley | |
| 8,303,842 B2 | 11/2012 | Utter | |
| 8,741,058 B1 | 6/2014 | Easton et al. | |
| 9,662,630 B2 | 5/2017 | Bisque et al. | |
| 10,357,755 B2 | 7/2019 | Bisque et al. | |
| 2003/0165359 A1 | 9/2003 | Chowdhury et al. | |
| 2004/0018130 A1 | 1/2004 | Forrester | |
| 2006/0094920 A1 | 5/2006 | Roper, Jr. | |
| 2006/0210463 A1 | 9/2006 | Comrie | |
| 2009/0118564 A1 | 5/2009 | McCullough et al. | |
| 2012/0055373 A1 | 3/2012 | Guyot et al. | |
| 2013/0171687 A1* | 7/2013 | Moularat | G01N 33/0029 435/34 |
| 2013/0287653 A1 | 10/2013 | Joshi et al. | |
| 2015/0360234 A1 | 12/2015 | Baldrey | |
| 2019/0282995 A1 | 9/2019 | Bisque et al. | |

FOREIGN PATENT DOCUMENTS

| | | |
|---|---|---|
| CN | 102921537 | 2/2013 |
| DE | 3339197 | 5/1984 |
| KR | 101031980 | 5/2011 |

OTHER PUBLICATIONS

Derwent-Acc-No. 2012-J33531 (abstract of Korean Patent Specification No. KR 2012077747 A) (Year: 2012).
Official Action for U.S. Appl. No. 16/427,819, dated Jun. 14, 2021 14 pages.
"Technology Request, High value-added recycling technologies for the minerals collected from fly ash," Enterprise Europe Network, 2014, 3 pages.
Joshi, "A Low-cost Rare Earth Elements Recovery Technology," Physical Sciences Inc., 2013, pp. VG13-060-VG13-060-16.
Ekmann, "Rare Earth Elements in Coal Deposits—a Prospectivity Analysis," Search and Discover Article #80270, 2012, 40 pages.
Serre et al., "Evaluation of the Impact of Chlorine on Mercury Oxidation in a Pilot-Scale Coal Combustor—the Effect of Coal Blending," U.S. Environmental Protection Agency, Sep. 2009, 21 pages.
Suzuki et al., "Instrumental neutron activation analysis for coal," Bunseki Kagaku, vol. 34, No. 5, 1985, pp. 217-223 (with English abstract).
International Search Report and Written Opinion for International Patent Application No. PCT/US2014/028138, dated Sep. 4, 2014, 14 pages.
International Preliminary Report on Patentability for International Patent Application No. PCT/US2014/028138, dated Sep. 24, 2015, 10 pages.
Protest for Canadian Application No. 2793326, dated Apr. 19, 2018, 17 pages.
Notice of Withdrawal of Notice of Allowance for Canadian Application No. 2793326, dated Apr. 30, 2018, 1 page.
Notice of Protest for Canadian Application No. 2788820, dated Mar. 7, 2018, 1 page.
Confirmation of Notice of Protest for Canadian Application No. 2788820, dated Mar. 7, 2018, 1 page.
Protest for Canadian Patent Application No. 2788820, dated Feb. 26, 2018, 6 pages.
Notice of Protest for Canadian Patent Application No. 2788820, dated Nov. 26, 2018, 1 page.
Confirmation of Notice of Protest for Canadian Application No. 2788820, dated Nov. 26, 2018, 1 page.
Protest for Canadian Application No. 278820, dated Nov. 6, 2018, 10 pages.
Notice of Allowance for U.S. Appl. No. 14/213,626, dated Nov. 25, 2015 7 pages.
Notice of Allowance for U.S. Appl. No. 14/213,626, dated Mar. 31, 2016 5 pages.
Official Action for U.S. Appl. No. 14/213,626, dated Aug. 8, 2016 14 pages.
Notice of Allowance for U.S. Appl. No. 14/213,626, dated Jan. 30, 2017 6 pages.
Official Action for U.S. Appl. No. 15/205,766, dated Oct. 13, 2016, 9 pages.
Official Action for U.S. Appl. No. 15/205,766, dated Feb. 28, 2017, 5 pages.
Official Action for U.S. Appl. No. 14/738,309, dated Dec. 29, 2016 6 pages Restriction Requirement.
Official Action for U.S. Appl. No. 14/738,309, dated Jun. 19, 2017 13 pages.
Official Action for U.S. Appl. No. 14/738,309, dated Jan. 26, 2018 15 pages.
Official Action for U.S. Appl. No. 14/738,309, dated Jun. 28, 2018, 13 pages.
Final Action for U.S. Appl. No. 14/738,309, dated Feb. 6, 2019, 9 pages.
Advisory Action for U.S. Appl. No. 14/738,309, dated Mar. 11, 2019, 9 pages.
Ex Parte Quayle Action for U.S. Appl. No. 14/738,309, dated Apr. 3, 2019, 9 pages.
Notice of Allowance for U.S. Appl. No. 14/738,309, dated Jan. 29, 2020, 7 pages.
Official Action for U.S. Appl. No. 16/427,819, dated Feb. 22, 2021 6 pages, Restriction Requirement.
Notice of Allowance for U.S. Appl. No. 14/738,309, dated Jun. 25, 2020, 8 pages.

* cited by examiner

METHODS TO SUBSTANTIALLY OPTIMIZE CONCENTRATION OF MATERIALS IN AN OUTPUT STREAM

CROSS REFERENCE TO RELATED APPLICATION

The present application is a divisional of U.S. patent application Ser. No. 14/738,309, filed Jun. 12, 2015, now U.S. Pat. No. 10,809,677, which claims the benefits of U.S. Provisional Application Ser. No. 62/011,452, filed Jun. 12, 2014, entitled "METHOD TO OPTIMIZE CONCENTRATION OF MATERIALS IN WASTE STREAMS", which is incorporated herein by this reference in its entirety.

FIELD

The disclosure relates generally to recovery of a material of interest and particularly to concentration and/or recovery of a material of interest in an input stream.

BACKGROUND

Coal-fired power plants, in particular their waste streams, have been identified as a new source of interest for mineral extraction or recovery. It is well known that waste streams, in particular coal ash and Flue Gas Desulfurization ("FGD") scrubber blowdown waste streams, contain many common, and hazardous, metals (e.g., Hg, Al, As, Cr, Ni, and Se). However, some waste streams also contain elevated concentrations of materials of interest, such as rare earth elements ("REEs") (e.g., Ce, La, Ga, Ge) and/or sorbents (e.g., activated carbon and halogens). As demand for these materials of interest increases, recovery of the materials from power plant waste streams becomes attractive.

Companies are working on methods to extract materials of interest from waste streams. However, harvesting most materials at economic rates presents several problems. Of particular concern, material concentrations can be quite low, making extraction economically infeasible. Particularly desirable materials, such as REEs, are typically present at concentrations on the order of less than 1 ppm in coal. Similarly, halogen concentrations may be present in concentrations of less than 5 ppm in the coal, and perhaps slightly higher in the fly ash. Recovery of a meaningful quantity of these materials therefore requires treatment of a large quantity of ash, to yield a relatively low quantity of material. Further complicating the problem, known treatment processes often require use of hazardous compounds, including acids, resulting in additional waste generation and associated costs. The result is that known treatment processes are uneconomical on a commercial scale.

Other active areas of research relate to stabilization of waste stream byproducts. Efforts include stabilizing or otherwise containing waste in solid or semi-solid forms that prevent leaching of hazardous materials into the surrounding environment. In these processes, volume and scale again are problematic. Concentrations of harmful materials, such as mercury, may be present in concentrations on the order of less than 10 ppm. In short, large volumes of waste streams must be treated to address a relatively small amount of undesirable material.

A need therefore exists to find a method and system to economically identify and collect materials of interest from waste streams. A further need exists to increase concentrations of undesirable materials to minimize volumes of waste stream requiring treatment.

SUMMARY

These and other needs are addressed by the various aspects, embodiments, and/or configurations of the present disclosure. The present disclosure provides methods and systems to address these needs. It discloses an automated method and system to separate output material having at least a selected threshold level of a material of interest from output material that does not.

A method can include the steps:

(a) monitoring, by a monitor, an input and/or output stream ("the monitored stream") for the presence of a material of interest and/or concentration of the material of interest;

(b) when the material of interest is present and/or has at least a threshold concentration, directing, by a controller, the monitored stream to a waste location or path to discard the material of interest; and (c) when the material of interest is either not present or does not have at least a threshold concentration, directing, by the controller, the monitored stream to a byproduct location or path to recover the material of interest.

A tangible and non-transitory computer readable medium can include instructions that, when executed by a microprocessor, perform functions including:

(a) receive, from a monitor, a measurement signal indicating the presence of a material of interest and/or concentration of the material of interest in the monitored stream; and (b) apply the following rules:

(B1) when the material of interest is present and/or has at least a threshold concentration, direct the monitored stream to a waste location or path to discard the material of interest; and (B2) when the material of interest is either not present or does not have at least a threshold concentration, direct the monitored stream to a byproduct location or path to recover the material of interest.

A system can include:

(a) a monitor to monitor the monitored stream for the presence of a material of interest and/or concentration of the material of interest; and (b) a controller to apply the following rules:

(B1) when the material of interest is present and/or has at least a threshold concentration, direct the monitored stream to a waste location or path to discard the material of interest; and (B2) when the material of interest is either not present or does not have at least a threshold concentration, direct the monitored stream to a byproduct location or path to recover the material of interest.

The input stream can include one or more of biomass and coal. The coal can be high iron, high alkali and/or high sulfur.

The output stream can be generated by combustion of the input stream, such as in a utility or incinerator, and the output stream can be ash.

When the material of interest is present and/or has at least a threshold concentration, an electrostatic precipitator or baghouse can collect the ash in a receptacle for removal to the byproduct location and, when the material of interest is either not present or does not have at least a threshold concentration, the electrostatic precipitator or baghouse can collect the ash in the receptacle for removal to the waste location.

The material of interest can be one or more of a class IIIB transition metal, a class IVB metal, a class VIB metal, a class VIII metal, a class IB metal, a class IIB metal, and a class IIIB metal, a basic metal, a semimetal, a nonmetal, a halogen, and activated carbon.

The monitor can be one or more of a particle detector, a detector using a physical and chemical method of analysis, a detector using a physical and physicochemical method of analysis, and a detector using a purely physical method of analysis.

The monitored stream can be determined to have the material of interest or have at least a threshold concentration of the material of interest when the monitor determines a source or origin of the at least one of the input and output stream.

The disclosure can address the problem of a low concentration of a material of interest by providing additional steps, functions, or operations to increase the concentration of the material of interest in the output stream prior to its recovery or treatment. After increasing the concentration of the material of interest, the recovery or treatment method or process can take advantage of the higher starting concentration of the material of interest to achieve superior yield in material extraction. Accordingly, concentrating undesirable materials in a lower volume of ash can reduce the amount of treatment chemicals required and can result in a lower overall quantity of stabilized waste.

The monitor commonly identifies when the monitored stream contains at least a selected concentration of the material of interest. The selected concentration can be higher or lower than a typical concentration, depending on the subsequent treatment or processing to be executed. When a monitored stream with a higher concentration of the material of interest is detected, the diversion mechanism segregates or separates the portion of the monitored stream having a higher concentration of the material of interest from the portion of the monitored stream having a lower concentration of the material of interest. This generates the byproduct stream having a higher concentration of the material of interest. By identifying input feed and/or output streams with higher concentrations of the material of interest, costs can be reduced by collecting the higher concentration monitored stream only when concentrations of the material of interest are at an economically justifiable level.

Applications of the process be beneficially applied on both feed material streams and waste streams and may be utilized remotely or on a plant site at point of use of the feed material.

The material of interest can be an invaluable or undesirable material, such as a toxic material, and the method and system used to sort and/or concentrate the invaluable or undesirable material. For example, coal with relatively higher concentrations of mercury can be identified before combustion. The steps, functions and operations disclosed above can then be executed to concentrate fly ash with relatively high concentrations of mercury. The steps, functions and operations can reach the same result by detecting the high concentrations of mercury in the fly ash, after combustion of the feed material has begun. The process can therefore lead to smaller concentrations of material requiring treatment or stabilization.

An optional transporting step can occur after sorting. The sorted material contains a higher or lower concentration of a material of interest. The sorted material can be transported to a location on the plant site or to a remote treatment facility for treatment or processing of the sorted material. This is particularly useful when the treatment site is a facility independent from the plant. The plant can sell sorted material with relatively high or low concentrations of materials interest to treatment facilities, and generate a revenue stream.

The above process can be applied to a wide range of waste streams. Preferred embodiments include coal fired power plants, and their associated waste streams. Other non-limiting applications include water treatment facilities, waste burning facilities, refineries, or any other industrial application featuring combustion of a feed material and generation of a waste stream.

The present disclosure can provide a number of other advantages depending on the particular aspect, embodiment, and/or configuration. The present disclosure discloses how to create fly ash streams with higher concentrations of desired materials to facilitate economic extraction of the materials. The techniques of the disclosure can also be used to concentrate undesirable materials in smaller volumes of an ash stream to reduce the cost of stabilization treatments. The techniques can therefore provide methods to increase concentrations of materials of interest in a waste stream, to facilitate removal and/or collection of target materials.

These and other advantages will be apparent from the disclosure.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces)) or chemisorption (characteristic of covalent bonding). It may also occur due to electrostatic attraction.

"Ash" refers to the residue remaining after complete combustion of the coal particles. Ash typically includes mineral matter (silica, alumina, iron oxide, etc.).

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "automatic" and cognates thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

"Biomass" refers to biological matter from living or recently living organisms. Examples of biomass include, without limitation, wood, waste, (hydrogen) gas, seaweed, algae, and alcohol fuels. Biomass can be plant matter grown to generate electricity or heat. Biomass also includes, without limitation, plant or animal matter used for production of fibers or chemicals. Biomass further includes, without limitation, biodegradable wastes that can be burnt as fuel but generally excludes organic materials, such as fossil fuels, which have been transformed by geologic processes into substances such as coal or petroleum. Industrial biomass can be grown from numerous types of plants, including miscanthus, switchgrass, hemp, corn, poplar, willow, sorghum, sugarcane, and a variety of tree species, ranging from eucalyptus to oil palm (or palm oil).

"Coal" refers to a combustible material formed from prehistoric plant life. Coal includes, without limitation, peat, lignite, sub-bituminous coal, bituminous coal, steam coal, anthracite, and graphite. Chemically, coal is a macromolecular network comprised of groups of polynuclear aromatic rings, to which are attached subordinate rings connected by oxygen, sulfur, and aliphatic bridges.

A "composition" refers to one or more chemical units composed of one or more atoms, such as a molecule, polyatomic ion, chemical compound, coordination complex, coordination compound, and the like. As will be appreciated, a composition can be held together by various types of bonds and/or forces, such as covalent bonds, metallic bonds, coordination bonds, ionic bonds, hydrogen bonds, electrostatic forces (e.g., van der Waal's forces and London's forces), and the like.

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The terms "determine", "calculate" and "compute," and cognates thereof, as used herein, are used interchangeably and include any type of methodology, process, mathematical operation or technique.

The term "electrostatic precipitator" (ESP) refers to a device that removes suspended dust particles from a gas or exhaust by applying a high-voltage electrostatic charge and collecting the particles on charged plates.

The term "flue-gas desulfurization" (FGD) refers to a set of technologies used to remove sulfur dioxide ($SO_2$) from exhaust flue gases of fossil-fuel power plants or from the emissions of other sulfur oxide emitting processes.

"Halogen" refers to an electronegative element of group VIIA of the periodic table (e.g., fluorine, chlorine, bromine, iodine, astatine, listed in order of their activity with fluorine being the most active of all chemical elements).

"Halide" refers to a binary compound of the halogens.

"High alkali coals" refer to coals having a total alkali (e.g., calcium) content of at least about 20 wt. % (dry basis of the ash), typically expressed as CaO, while "low alkali coals" refer to coals having a total alkali content of less than 20 wt. % and more typically less than about 15 wt. % alkali (dry basis of the ash), typically expressed as CaO.

"High iron coals" refer to coals having a total iron content of at least about 10 wt. % (dry basis of the ash), typically expressed as $Fe_2O_3$, while "low iron coals" refer to coals having a total iron content of less than about 10 wt. % (dry basis of the ash), typically expressed as $Fe_2O_3$. As will be appreciated, iron and sulfur are typically present in coal in the form of ferrous or ferric carbonates and/or sulfides, such as iron pyrite.

"High sulfur coals" refer to coals having a total sulfur content of at least about 1.5 wt. % (dry basis of the coal) while "medium sulfur coals" refer to coals having between about 1.5 and 3 wt. % (dry basis of the coal) and "low sulfur coals" refer to coals typically having a total sulfur content of less than about 1.5 wt. % (dry basis of the coal), more typically having a total sulfur content of less than about 1.0 wt. %, and even more typically having a total sulfur content of less than about 0.8 wt. % of the coal (dry basis of the coal).

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

Neutron Activation Analysis ("NAA") refers to a method for determining the elemental content of samples by irradiating the sample with neutrons, which create radioactive forms of the elements in the sample. Quantitative determination is achieved by observing the gamma rays emitted from these isotopes.

"Particulate" refers to fine particles, such as fly ash, unburned carbon, soot and fine process solids, typically entrained in a gas stream.

The phrase "ppmw X" refers to the parts-per-million, based on weight, of X alone. It does not include other substances bonded to X.

The phrase "ppmv X" refers to the parts-per-million, based on volume, of X alone. It does not include other substances bonded to X.

"Separating" and cognates thereof refer to setting apart, keeping apart, sorting, removing from a mixture or combination, or isolating. In the context of gas mixtures, separating can be done by many techniques, including electrostatic precipitators, baghouses, scrubbers, and heat exchange surfaces.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of adsorption.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
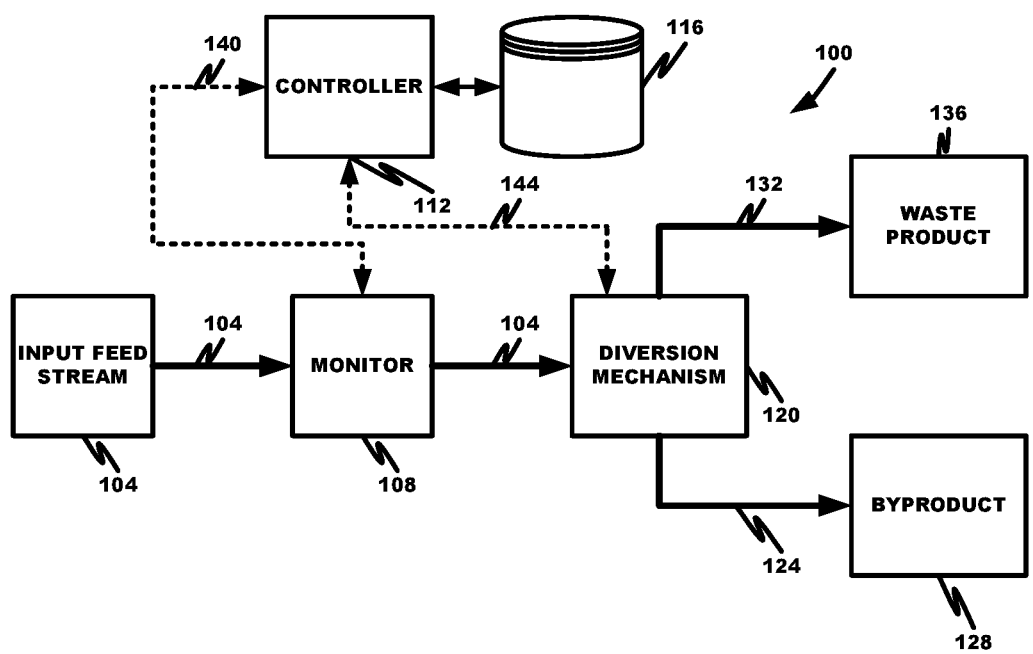
FIG. 1 depicts system according to an embodiment of the disclosure.

FIG. 1 depicts a system 100. An input feed stream 104 containing one or more materials of interest is sampled, tested, and/or analyzed by a monitor 108 for a material of interest. The monitor reading is provided, via control lines 140, to a controller 112 which stores the reading in a database 116 and compares the reading to a selected threshold value to determine if a sufficiently high level of the material of interest is present to form a byproduct. When a sufficiently high level of the material of interest is present, the controller 112 issues a command via control line 144 to the diversion mechanism 120 to direct the input feed stream 104 as a byproduct stream 124 to form a byproduct 128. When a sufficiently high level of the material of interest is not present, the controller 112 issues a command via control line 144 to the diversion mechanism 120 to direct the input feed stream 104 as a waste stream 132 to form a waste product 136.

Figure 2:
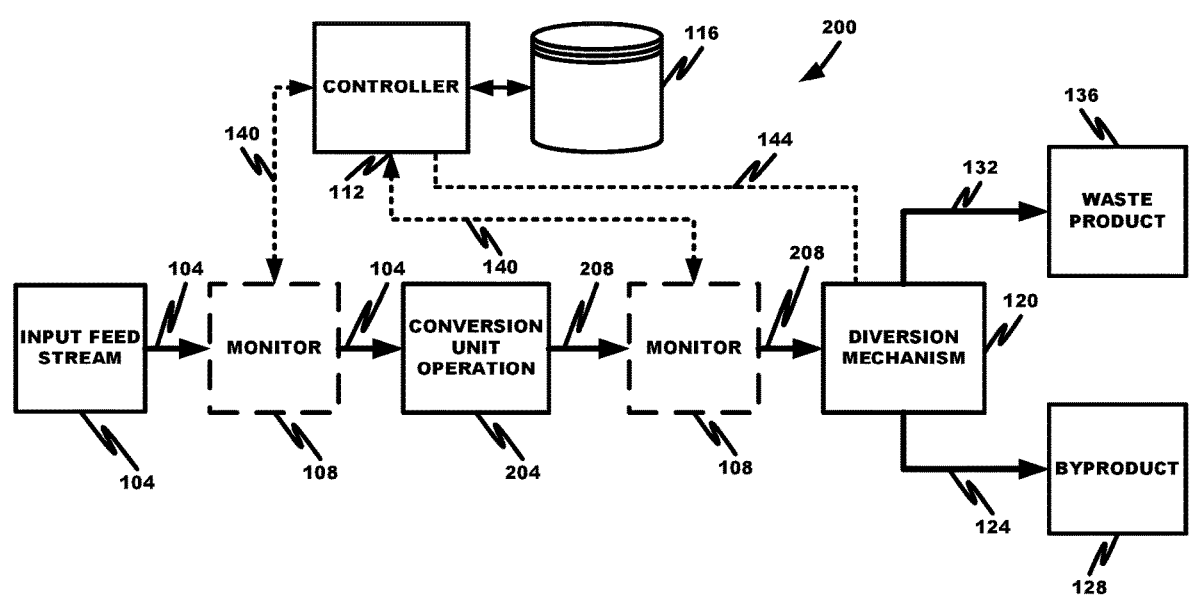
FIG. 2 depicts system according to an embodiment of the disclosure.

FIG. 2 depicts a system 200. The system includes the above components and the additional component of a conversion unit operation 204 to convert the input feed stream 104 from a first form (e.g., composition and/or phase) to a different second form (e.g., composition and/or phase) in an output stream 208. The conversion can be, for example, one or more of an oxidation process (such as a combustion process), a reduction process, a thermal heating or cooling process, a concentration process (e.g., flotation, scrubbing, gravity separation, cyclone, distillation, and filtration), and a mixing process.

As shown in FIG. 2, the monitor 108 can sense the presence and/or concentration of the material of interest in the input feed stream 104 and/or output stream 208 (hereinafter "monitored stream"). When the monitored stream is the input feed stream, the monitor 108 can measure concentrations of the material of interest in the feed stream itself. In these embodiments, the monitor 108 can analyze the input feed stream to determine the presence and/or concentration of materials of interest. Representative embodiments are particularly useful in plants that burn several different feed materials, for example, more than one type of coal or coal blends. When the monitored stream is the output stream, the monitor 108 can measure concentrations of the material of interest in the output stream itself.

In the system 200, the monitor 108, unit operation 204, and diversion mechanism 120 can be co-located or located at different locations. For example, the concentration of the material of interest is measured in the input feed stream prior to its introduction into a combustion unit of the unit operation 204. The monitor can be located at a plant containing the combustion unit or remote from the plant. The monitor can sense the material of interest in one or more coal stockpiles (the input feed stream) at a plant. The monitor can sense the material of interest before, during, or after the coals have been blended to form the input feed stream before or during feed to the combustion unit. The monitor 108, for instance, can be positioned at a conveyor just before the feed stream is fed into a combustion zone of the unit operation 204. The monitor can remotely sense the material of interest in the input feed or output streams as appropriate. For example, the monitor can be located at a coal mine or a location where the input feed stream is mined or otherwise extracted from the earth or anywhere between the mine and the plant where the feed material is fed into the combustion unit. The monitor can sense the material of interest in a deposit of the input feed stream, such as a coal seam. The input feed stream can be labeled or tagged before shipping to identify concentrations of materials of interest. The input feed stream then may be sorted at the plant prior to combustion. When executed remotely, the monitor can be effected on an automated continuous or semi-continuous basis or by manual sampling.

The input feed stream 104 can be any material of interest-containing solid, liquid or gaseous stream. Common materials of interest can include one or more of a transition metal (in particular a class IIIB transition metal (e.g., a lanthanide series metal, yttrium, scandium), a class IVB metal, a class VIB metal (e.g., chromium), a class VIII metal (e.g., nickel), a class IB metal (e.g., copper, silver and gold), a class IIB metal, and a class IIIB metal (e.g., mercury), a basic metal (e.g., aluminum), a semimetal (e.g., boron and arsenic), a nonmetal (e.g., selenium), a halogen (e.g., boron and iodine), and a (reusable) sorbent (e.g., activated carbon). Exemplary input feed streams include biomass, coal (e.g., high alkali, iron, and/or sulfur coals), and other fossil fuels.

The monitor 108 can be any suitable continuous, semi-continuous, or discrete measuring device. The measuring device detects, by any known means, the presence and/or concentration of the material of interest. The measuring device can be selected based on its properties to identify the material of interest. Exemplary measuring devices include particle detectors and chemical detectors (with the material of interest being the analyte) (e.g., NAA, detectors using physical methods of analysis, including auxiliary chemical detectors (such as volumetric—manometric or chemical gas analyzers), detectors using physical methods of analysis, including physicochemical processes (such as thermochemical, photocolorimetric, and chromatographic processes), and detectors using purely physical methods of analysis (such as thermoconductometric, densimetric, magnetic, optical, and ultraviolet). For example, a mercury detecting device might be utilized if mercury is the material of interest for an application. In other examples, the measuring device is an analyzer or probe designed to measure concentrations or quantity of the material of interest in a flue gas stream. In yet other examples, the measuring device is not automated. Continuous measurement is not necessary. A plant worker can take samples at appropriate intervals, for example every half hour, every hour, or every 12 hours. When a desired change in material of interest concentration is registered, the worker can manually execute the steps necessary to trigger the diversion mechanism 120 (e.g., a sorting sequence). In another example, a feed material is from a particular source and has a known concentration of the material of interest. In this example, automated monitoring of the feed material or the ash stream is not necessary. Rather, determination of the source of the feed material indicates the material of interest concentration. The source identification may be done manually or by detection of a tag, marker, or unique characteristic of the feed material. This and other infrequent sampling methods can be used where the material concentration is not expected to change measurably for relatively long periods of time. While feedback control systems may be utilized, manual systems are fully contemplated herein.

The controller 112 can be any microprocessor, and the database 116 any tangible and/or non-transitory computer readable medium. The controller receives a sensor reading from the monitor 108, compares the received reading against a selected value, and provides appropriate instructions to the diversion mechanism 120 to divert the monitored stream to the waste or byproduct stream. The database 116 commonly stores timestamped sensor readings received from the monitor 108. The database 116 can further include microprocessor readable and executable instructions that, when executed by the controller 112, perform the operations disclosed herein.

The diversion mechanism 120 can be any suitable diverting device or process and segregates or separates higher concentration portions of the input feed or output streams from lower concentration portions. The diversion mechanism 120 typically segregates portions of the output stream, such as an ash or flue gas stream generated from the combustion of coal. The diversion mechanism 120 can be one or more of a switching mechanism to divert a particle or fluid flow from a first path to a second path and vice versa (e.g., a 3-way valve, a damper, conveyor belts, and the like) and a collection device (e.g., a scrubber, electrostatic precipitator, filtration device (such as a baghouse), and the like). When the diversion mechanism 120 is a switching mechanism, it directs the input feed or output stream as appropriate along a first path when the material of interest is present or has a concentration at or above a selected value and along a second path when the material of interest is either not present nor has a concentration at or above a selected value. When the diversion mechanism 120 is a collection device, it either ceases or initiates collection when the material of interest is present or has a concentration at or above a selected value and the other of ceases or initiates collection when the material of interest is either not present nor has a concentration at or above a selected value. Alternatively, the collection device can discharge a first collected material into a first location or receptacle (e.g., hopper or pile) when the material of interest is present or has a concentration at or above a selected value and discharge a second collected material into a different second location or receptacle (e.g., hopper or pile) when the material of interest is either not present nor has a concentration at or above a selected value. In other words, the material of interest is either not present nor has a concentration at or above a selected value in the first collected material and is present or has a concentration at or above a selected value in the second material. In some applications, the diversion mechanism includes a transporting step, in which the input feed or output stream as appropriate is transported from a first location to a second location either (i) when the material of interest is present or has a concentration at or above a selected value or (ii) when the material of interest is either not present nor has a concentration at or above a selected value and to a different third location when the other of (i) or (ii) is true. In some applications, the monitor is located at a first location and the diversion mechanism at a second location. After measurement, the input feed or output stream as appropriate is transported to the second location where the diversion mechanism sorts the stream. In other embodiments, the second location is a treatment location that treats the input feed or output stream as appropriate and transports the treated stream to the plant for use.

Referring again to FIG. 2, an example of the system 200 will be discussed with reference to a utility or incinerator. A coal or biomass input feed stream 104 or output stream 208 containing one or more materials of interest (such as halogens or activated carbon) is sampled, tested, and/or analyzed by a monitor 108 for the material of interest. The input feed stream 104 is combusted or incinerated in the conversion unit operation 204 and discharged as the output stream 208. The monitor reading is provided, via control lines 140, to the controller 112 which stores the reading in the database 116 and compares the reading to a selected threshold value to determine if a sufficiently high level of the material of interest is present in the input feed stream or output stream to form a byproduct. When a sufficiently high level of the material of interest is present, the controller 112 issues a command via control line 144 to the diversion mechanism 120 (which is a collection device) to direct the input feed stream 104 as a byproduct stream 124 to form a byproduct 128. In response, the particulate collection device discharges first collected material to a first receptacle and initiates collection of second material in the output stream. For instance, the particulate collection device is emptied such as by ESP plates being cleaned, baghouse bags being shaken, or any other means to remove collected particles from the particulate collection device. The hoppers that hold particles removed from the particulate collection device may then be emptied. As a result, the particulate collection devices, and the associated hoppers, will begin to collect new ash and particulates containing the higher concentration of the material or materials of interest. When a sufficiently high level of the material of interest is not present in the input feed or output stream, the controller 112 issues a command via control line 144 to the diversion mechanism 120 to direct the input feed stream 104 as a waste stream 132 to form a waste product 136. In response, the collection device discharges the second collected material to a second receptacle and initiates collection of first material in the output stream. As noted, the particulate collection device is emptied to remove collected particles from the particulate collection device. The hoppers that hold particles removed from the particulate collection device are emptied. As a result, the particulate collection devices, and the associated hoppers, will begin to collect new ash and particulates containing the lower concentration of the material or materials of interest.

Sorting the waste stream in a utility or incinerator in this way can increase the concentration of the material of interest by up to two times, more preferably up to three times, and possibly more than ten times when compared to the concentration that existed in the initial waste stream. When the treatment methods are applied to the ash, the higher concentration will yield greater removal of the material or materials of interest. Additionally, the treatment methods will be applied to a smaller volume of ash, lowering the overall cost of treating the ash while maintaining or increasing the yield of extracted material or materials of interest.

In another example, the feed material is coal. A first coal source has a first concentration of a material of interest, such as mercury or a halogen. The first concentration is measured by the monitor, either before or after the material is placed on a feed line into the furnace. The monitor sends a signal containing data relating to the first concentration to the controller, which stores the data in the database. The feed material is then changed to a second coal source. The second coal source has a second concentration of the material of interest. The second concentration is measured by the monitor in the same way that the first concentration was measured. The monitor sends a second signal containing data relating to the second concentration to the controller, which stores the data the database. The controller then compares the data from the first measuring step to the data from the second measuring step and issues an appropriate command signal to the diversion mechanism.

In another example, the monitored stream is a waste stream, particularly an ash stream or FGD blowdown stream. Other non-limiting examples include bottom ash, or ESP ash. The monitor analyzes the output stream to determine concentration of the material of interest. The monitor can be positioned at any location in the output stream. Positioning the monitor to measure the output stream is generally preferred, as measurement of materials in the output stream can be easier and cheaper to do on a continuous basis as compared with measurement of materials in the feed material. However, measuring at the feed material can be desirable, in particular when the feed material composition is known, or can be readily ascertained by cost-effective means. The monitor is normally placed downstream of the combustion unit and upstream of a precipitator or baghouse, or any other particulate collection device.

The process can be applied to undesirable or invaluable materials of interest, such as toxic materials.

One or more waste or output streams can be diverted for treatment and stabilization.

The constituents in the waste or output stream can determine the most effective stabilization process. For example, different processes, or different concentrations of additives for a similar process, might be used to treat waste streams with relatively higher concentrations of Class C or Class F fly ash, respectively. By detecting the relative ratios of the classes of ash, or any other material of interest, a toxic material stabilization treatment process can be optimized to the content of the incoming waste stream.

In other applications, valuable materials, such as rare earth elements, halides, or halogens are the material of interest. The material of interest can be detected by measuring its concentration in the feed material or by measurement of the fly ash.

In either case, the process can lead to a collection of fly ash with a relatively high concentration of the material of interest. Expensive treatment and extraction processes can be applied to the fly ash with relatively higher concentration of the material(s) of interest, rather than to the entire ash stream. This can make expensive treatment and extraction processes more economical, by focusing treatment on streams that will generate a relatively higher yield for the same cost of treatment.

Figure 3:
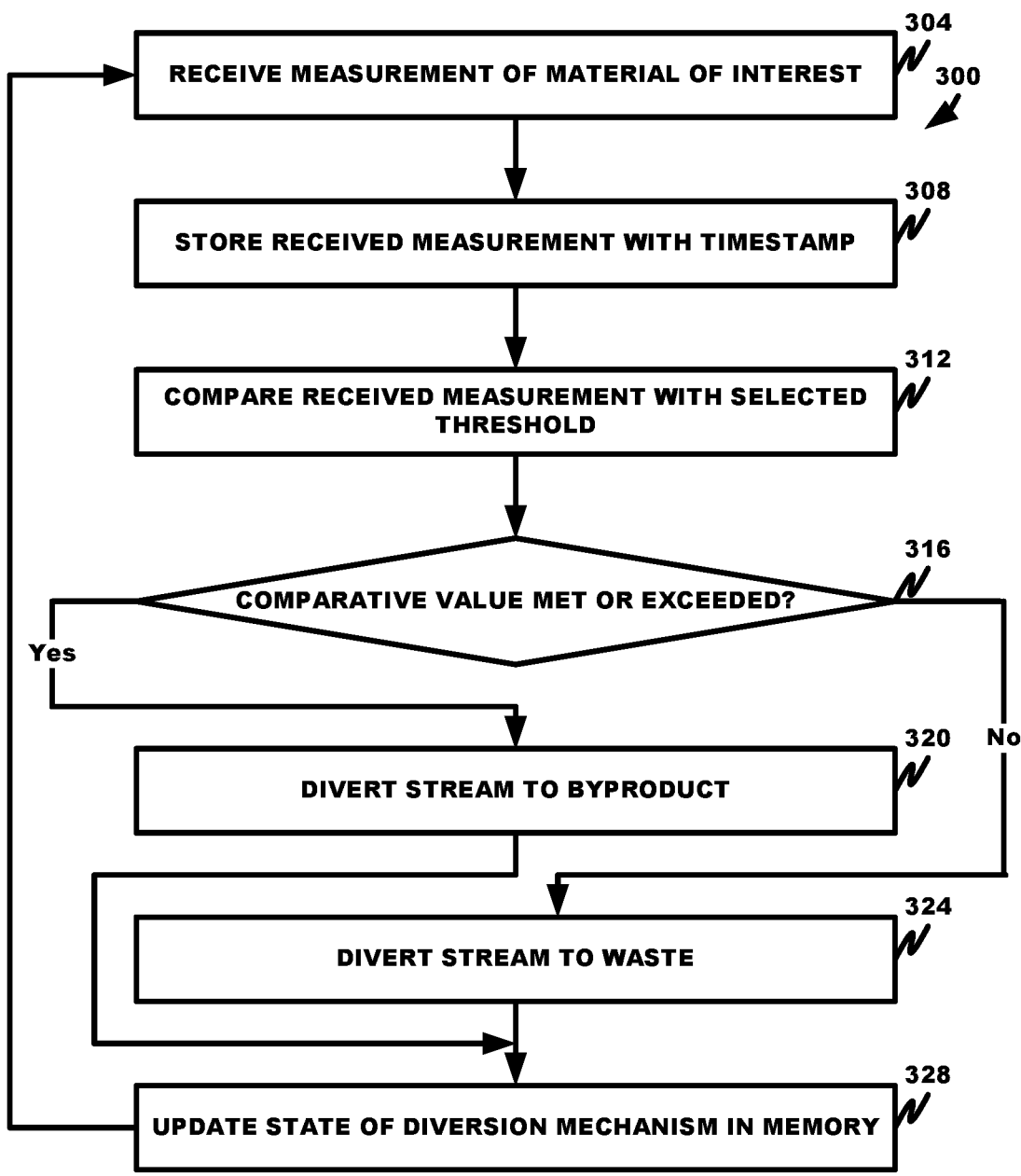
FIG. 3 is a flow chart of the control logic for the system of FIGS. 1 and 2.

The logic flow 300 of the controller will now be discussed with reference to FIG. 3.

In step 304, the controller receives a measurement signal regarding the presence or concentration of the material of interest in the input feed or output material as appropriate. As will be appreciated, the monitor generates a signal containing information related to the presence or concentration of the material of interest and sends the signal to the controller. The monitor may generate a signal indicating a source or origin of the input feed or output material. In that case, the monitor can determine the source or origin based on a label, identifier and/or other unique or relatively unique characteristic associated with the source or origin. The monitor can be a user interface in which the source or origin is entered by a user based on information received with the shipment delivering the material to the subject site.

In step 308, the controller accepts the signal from the monitor and stores the timestamped data in the database. The database can hold a reference database that can be used to compare different measurements over time. The reference database can include a historical set of measurements (e.g., previously received single measurement or average, mean, or mode of multiple previously received measurements) representing a historical concentration of the material of interest and/or a predetermined threshold or selected value. Historical data can be measured and compared over any desirable time frame, such as a running average, 30-day mean, etc.

In step 312, the controller compares the received data with a historical set of measurements and/or threshold or selected value to determine if the material of interest is present or a desired concentration of the material of interest is in the monitored stream.

In decision diamond 316, the controller determines whether or not the comparative value is met or exceeded. When the comparative value is met or exceeded, the controller sends a command signal to the diversion mechanism 120 to divert the monitored stream to the byproduct stream. When the comparative value is either unmet or not exceeded, the controller sends a command signal to the diversion mechanism 120 to divert the monitored stream to the waste stream.

In step 320, the diversion mechanism 120 receives the command signal from the controller and diverts the monitored stream to the byproduct stream. The diversion can be done by a sorting unit carrying out a sorting sequence. The sorting sequence commonly comprises one or more steps required to segregate the monitored stream so as to concentrate the material of interest.

In step 324, the diversion mechanism 120 receives the command signal from the controller and diverts the monitored stream to the waste stream. As in step 320, the diversion can be done by a sorting unit carrying out a sorting sequence. The sorting sequence commonly comprises one or more steps required to segregate the monitored stream so as to concentrate the waste material.

In step 328, the controller updates in the database the current state of the diversion mechanism and returns to step 304.

All of the above steps can be conducted individually, or in any combination in embodiments of the disclosure.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The exemplary systems and methods of this disclosure have been described in relation to control feedback systems. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In one alternative embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   monitoring, by a monitor, an output stream for a presence of a material of interest in the output stream and/or a concentration of the material of interest in the output stream, wherein the output stream is generated by an input stream comprising at least one of biomass and coal, and wherein the output stream comprises ash;
   receiving, by a microprocessor from the monitor, a sensor reading;
   based on the sensor reading, determining, by the microprocessor, whether the material of interest is present in the output stream and/or has at least a threshold concentration in the output stream;
   in response to determining that the material of interest is present in the output stream and/or has the at least a threshold concentration in the output stream, commanding, by the microprocessor, a diversion mechanism, located downstream of the monitor, to direct the input stream or the output stream to a first location or path for a first treatment or processing of a first sorted material; and
   in response to determining that the material of interest is either not present in the output stream or does not have the at least a threshold concentration in the output stream, commanding, by the microprocessor, the diversion mechanism to direct the input stream or the output stream to a different second location or path for a second treatment or processing of a second sorted material.

2. The method of claim 1, wherein the input stream or the output stream is the input stream, wherein the first location or path is a first feed material stockpile and the second location or path is a second feed material stockpile, wherein the first treatment or processing is forming a first blending ratio in a feed material and the second treatment or processing is forming a second blending ratio in the feed material, and wherein the microprocessor determines that the material of interest has the at least a threshold concentration in the output stream and further comprising:

retrieving, by the microprocessor from memory, a selected value;

comparing, by the microprocessor, the selected value against the sensor reading; and when the sensor reading exceeds the selected value, determining, by the microprocessor, that the material of interest has the at least a threshold concentration in the output stream.

3. The method of claim 1, wherein the input stream or the output stream is the output stream, wherein the first location or path recovers the material of interest from the ash and the second location or path discards the material of interest, and wherein the first treatment or processing recovers the material of interest and the second treatment or processing stabilizes the ash for discard.

4. The method of claim 3, wherein the diversion mechanism is one or more of a switching mechanism that diverts the output stream from the first location or path to the second location or path and vice versa and a collection device that either ceases or initiates collection in response to the material of interest being present and/or having the at least a threshold concentration and the other of ceases or initiates collection in response to the material of interest either not being present or not having the at least a threshold concentration.

5. The method of claim 4, wherein the material of interest comprises one or more of a class IIIB transition metal, a class IVB metal, a class VIB metal, a class VIII metal, a class IB metal, a class IIB metal, a class IIIB metal, a basic metal, a semimetal, a nonmetal, a halogen, and activated carbon and wherein, in response to determining that the material of interest is present and/or has the at least a threshold concentration, an electrostatic precipitator or a baghouse collects the ash in a receptacle for removal to the first location or path and in response to the material of interest either not being present or not having the at least a threshold concentration, the electrostatic precipitator or the baghouse collects the ash in the second location or path.

6. The method of claim 4, wherein the monitor comprises one or more of a particle detector, a detector using a physical and chemical method of analysis, a detector using a physical and physicochemical method of analysis, and a detector using a physical method of analysis and wherein the diversion mechanism comprises one or more of a 3-way valve, a damper, and a conveyor belt and the collection device comprises one or more of a scrubber, an electrostatic precipitator, and a filtration device.

7. The method of claim 1, wherein at least one of the input and the output streams is determined to have the material of interest or have the at least a threshold concentration of the material of interest when the monitor determines a source or origin of at least one of the input and the output stream.

8. The method of claim 2, wherein the monitor comprises one or more of a particle detector, a detector using a physical and chemical method of analysis, a detector using a physical and physicochemical method of analysis, and a detector using a physical method of analysis.

9. The method of claim 8, wherein the material of interest comprises one or more of a class IIIB transition metal, a class IVB metal, a class VIB metal, a class VIII metal, a class IB metal, a class IIB metal, a class IIIB metal, a basic metal, a semimetal, a nonmetal, a halogen, and activated carbon and wherein the diversion mechanism comprises a switching mechanism to divert the input stream from the first location or path to the second location or path and vice versa.

10. The method of claim 9, wherein the monitor is at a mine and the first and second locations or paths are different haulage vehicles, and wherein the diversion mechanism comprises one or more of a 3-way valve, a damper, and a conveyor belt.

11. A method, comprising:

monitoring, by a monitor, an output stream to determine whether a material of interest is present in the output stream and/or at least has a threshold concentration in the output stream, wherein the output stream is generated by combustion of an input stream comprising coal, and wherein the output stream comprises ash;

in response to determining that the material of interest is present in the output stream and/or has the at least a threshold concentration in the output stream, commanding, by a microprocessor, a diversion mechanism, located downstream of the monitor, to direct the input stream or the output stream to a first location or path for a first treatment or processing of a first sorted material; and in response to determining that the material of interest is either not present in the output stream or does not have the at least a threshold concentration in the output stream, commanding, by the microprocessor, the diversion mechanism to direct the input stream or the output stream to a different second location or path for a second treatment or processing of a second sorted material.

12. The method of claim 11, wherein the input stream or the output stream is the input stream, wherein the first location or path is a first feed material stockpile and the second location or path is a second feed material stockpile, wherein the first treatment or processing is forming a first blending ratio in a feed material and the second treatment or processing is forming a second blending ratio in the feed material, and wherein the microprocessor determines that the material of interest has the at least a threshold concentration in the input stream and further comprising:

retrieving, by the microprocessor from memory, a selected value;

comparing, by the microprocessor, the selected value against a sensor reading from the monitor; and when the sensor reading exceeds the selected value, determining, by the microprocessor, that the material of interest has the at least a threshold concentration in the output stream.

13. The method of claim 11, wherein the input stream or the output stream is the output stream, wherein the first location or path recovers the material of interest from the ash and the second location or path discards the material of interest, and wherein the first treatment or processing recovers the material of interest and the second treatment or processing stabilizes the ash for discard.

14. The method of claim 13, wherein the diversion mechanism is one or more of a switching mechanism that diverts the output stream from the first location or path to the second location or path and vice versa and a collection device that either ceases or initiates collection in response to the material of interest being present and/or having the at least a threshold concentration and the other of ceases or initiates collection in response to the material of interest either not being present or not having the at least a threshold concentration.

15. The method of claim 14, wherein the material of interest comprises one or more of a class IIIB transition metal, a class IVB metal, a class VIB metal, a class VIII metal, a class IB metal, a class IIB metal, a class IIIB metal, a basic metal, a semimetal, a nonmetal, a halogen, and activated carbon and wherein, in response to determining that the material of interest is present and/or has the at least a threshold concentration, an electrostatic precipitator or a baghouse collects the ash in a receptacle for removal to the first location or path and in response to the material of interest either not being present or not having the at least a threshold concentration, the electrostatic precipitator or the baghouse collects the ash in the second location or path.

16. The method of claim 14, wherein the monitor comprises one or more of a particle detector, a detector using a physical and chemical method of analysis, a detector using a physical and physicochemical method of analysis, and a detector using a physical method of analysis and wherein the diversion mechanism comprises one or more of a 3-way valve, a damper, and a conveyor belt and the collection device comprises one or more of a scrubber, an electrostatic precipitator, and a filtration device.

17. The method of claim 11, wherein the input stream is determined to have the material of interest or have the at least a threshold concentration of the material of interest in response to the monitor determining that a source or origin of the input stream is a first source or origin, wherein the input stream is determined not to have the material of interest or the at least a threshold concentration of the material of interest in response to the monitor determining that the source or origin of the input stream is a second source or origin, and wherein the monitor determines the source or origin by reading a value from a readable tag, the value being associated with the input stream.

18. The method of claim 12, wherein the monitor comprises one or more of a particle detector, a detector using a physical and chemical method of analysis, a detector using a physical and physicochemical method of analysis, and a detector using a physical method of analysis.

19. The method of claim 18, wherein the material of interest comprises one or more of a class IIIB transition metal, a class IVB metal, a class VIB metal, a class VIII metal, a class IB metal, a class IIB metal, a class IIIB metal, a basic metal, a semimetal, a nonmetal, a halogen, and activated carbon and wherein the diversion mechanism comprises a switching mechanism to divert the input stream from the first location or path to the second location or path and vice versa.

20. The method of claim 19, wherein the monitor is at a mine and the first and second locations or paths are different haulage vehicles, and wherein the diversion mechanism comprises one or more of a 3-way valve, a damper, and a conveyor belt.

21. A method, comprising:
monitoring, by a monitor, an output stream for a presence of a material of interest in the output stream and/or a concentration of the material of interest in the output stream, the output stream being generated by combustion of an input stream comprising coal, wherein the output stream comprises ash;
determining, by a microprocessor, whether the material of interest is present in the output stream and/or has at least a threshold concentration in the output stream;
in response to determining that the material of interest is present in the output stream and/or has the at least a threshold concentration in the output stream, commanding, by the microprocessor, a diversion mechanism, located downstream of the monitor, to direct the input stream or the output stream to a first location or path for a first treatment or processing of a first sorted material; and
in response to determining that the material of interest is either not present in the output stream or does not have the at least a threshold concentration in the output stream, commanding, by the microprocessor, the diversion mechanism to direct the input stream or the output stream to a different second location or path for a second treatment or processing of a second sorted material.

22. The method of claim 21, wherein the input stream or the output stream is the input stream, wherein the first location or path is a first feed material stockpile and the second location or path is a second feed material stockpile, wherein the first treatment or processing is forming a first blending ratio in a feed material and the second treatment or processing is forming a second blending ratio in the feed material, and wherein the microprocessor determines that the material of interest has the at least a threshold concentration in the input stream and further comprising:
retrieving, by the microprocessor from memory, a selected value;
comparing, by the microprocessor, the selected value against a sensor reading from the monitor; and
when the sensor reading exceeds the selected value, determining, by the microprocessor, that the material of interest has the at least a threshold concentration in the output stream.

23. The method of claim 21, wherein the input stream or the output stream is the output stream, wherein the first location or path recovers the material of interest from the ash and the second location or path discards the material of interest, and wherein the first treatment or processing recovers the material of interest and the second treatment or processing stabilizes the ash for discard.

24. The method of claim 23, wherein the diversion mechanism is one or more of a switching mechanism that diverts the output stream from the first location or path to the second location or path and vice versa and a collection device that either ceases or initiates collection in response to the material of interest being present and/or having the at least a threshold concentration and the other of ceases or initiates collection in response to the material of interest either not being present or not having the at least a threshold concentration.

25. The method of claim 24, wherein the material of interest comprises one or more of a class IIIB transition metal, a class IVB metal, a class VIB metal, a class VIII metal, a class IB metal, a class IIB metal, a class IIIB metal, a basic metal, a semimetal, a nonmetal, a halogen, and activated carbon and wherein, in response to determining that the material of interest is present and/or has the at least a threshold concentration, an electrostatic precipitator or a baghouse collects the ash in a receptacle for removal to the first location or path and in response to the material of interest either not being present or not having the at least a threshold concentration, the electrostatic precipitator or the baghouse collects the ash in the second location or path.

26. The method of claim 24, wherein the monitor comprises one or more of a particle detector, a detector using a physical and chemical method of analysis, a detector using a physical and physicochemical method of analysis, and a detector using a physical method of analysis and wherein the diversion mechanism comprises one or more of a 3-way valve, a damper, and a conveyor belt and the collection device comprises one or more of a scrubber, an electrostatic precipitator, and a filtration device.

27. The method of claim 21, wherein the input stream is determined to have the material of interest or have the at least a threshold concentration of the material of interest in response to the monitor determining that a source or origin of the input stream is a first source or origin, wherein the input stream is determined not to have the material of interest or the at least a threshold concentration of the material of interest in response to the monitor determining that the source or origin of the input stream is a second source or origin, and wherein the monitor determines the source or origin by reading a value from a readable tag, the value being associated with the input stream.

28. The method of claim 22, wherein the monitor comprises one or more of a particle detector, a detector using a physical and chemical method of analysis, a detector using a physical and physicochemical method of analysis, and a detector using a physical method of analysis.

29. The method of claim 28, wherein the material of interest comprises one or more of a class IIIB transition metal, a class IVB metal, a class VIB metal, a class VIII metal, a class IB metal, a class IIB metal, a class IIIB metal, a basic metal, a semimetal, a nonmetal, a halogen, and activated carbon and wherein the diversion mechanism comprises a switching mechanism to divert the input stream from the first location or path to the second location or path and vice versa.

30. The method of claim 29, wherein the monitor is at a mine and the first and second locations or paths are different haulage vehicles, and wherein the diversion mechanism comprises one or more of a 3-way valve, a damper, and a conveyor belt.

* * * * *